(12) United States Patent
Knowler et al.

(10) Patent No.: US 10,771,359 B2
(45) Date of Patent: Sep. 8, 2020

(54) SYSTEM CAPACITY HEATMAP

(71) Applicant: FIDESSA TRADING UK LIMITED, London (GB)

(72) Inventors: Richard Knowler, Brooklyn, NY (US); Ian Hiscock, Surrey (GB); David Guy John, Surrey (GB)

(73) Assignee: Fidessa Trading UK Limited, London (GB)

( * ) Notice: Subject to any disclaimer, the term of this patent is extended or adjusted under 35 U.S.C. 154(b) by 159 days.

(21) Appl. No.: 15/376,899

(22) Filed: Dec. 13, 2016

(65) Prior Publication Data

US 2017/0171041 A1 Jun. 15, 2017

Related U.S. Application Data

(60) Provisional application No. 62/266,841, filed on Dec. 14, 2015.

(51) Int. Cl.
*H04L 12/26* (2006.01)
*H04L 29/08* (2006.01)

(52) U.S. Cl.
CPC ............ *H04L 43/045* (2013.01); *H04L 43/08* (2013.01); *H04L 43/0817* (2013.01); *H04L 43/0852* (2013.01); *H04L 67/10* (2013.01)

(58) Field of Classification Search
CPC ... H04L 43/045; H04L 43/08; H04L 43/0817; H04L 43/0852; H04L 67/10
See application file for complete search history.

(56) References Cited

U.S. PATENT DOCUMENTS

| | | | | |
|---|---|---|---|---|
| 6,966,033 | B1 * | 11/2005 | Gasser | H04L 41/22 |
| | | | | 715/738 |
| 8,583,631 | B1 * | 11/2013 | Ganapathi | G06F 16/2425 |
| | | | | 707/722 |
| 8,626,671 | B2 * | 1/2014 | Federgreen | G06Q 30/018 |
| | | | | 705/317 |
| 9,032,531 | B1 * | 5/2015 | Scorvo | H04L 63/1408 |
| | | | | 726/25 |
| 9,705,815 | B2 * | 7/2017 | Mattson | H04L 41/145 |
| 9,800,470 | B2 * | 10/2017 | Agarwal | H04L 41/12 |
| 9,917,853 | B2 * | 3/2018 | Seigel | H04L 63/1416 |
| 9,938,019 | B2 * | 4/2018 | Floyd | B64D 45/0015 |
| 9,954,884 | B2 * | 4/2018 | Hassell | H04L 63/1441 |
| 2012/0278365 | A1 * | 11/2012 | Labat | G06F 16/9024 |
| | | | | 707/798 |

(Continued)

*Primary Examiner* — Uzma Alam
(74) *Attorney, Agent, or Firm* — Baker Botts L.L.P.

(57) ABSTRACT

The methods and systems described herein can be used for generating a graphical representation, such as a heatmap, for displaying and visualizing a given metric associated with one or more distributed resources in a distributed environment. A heatmap generally refers to a graphical display of data in which values are located in a matrix and indicated by the intensity of a color, hue, shading or some other gradient, or by geometric shape or other format. Heatmaps provide a way of visualizing metrics of a large number of resources easily for capacity management, among other uses. Generally, and as set forth in greater detail, the disclosed subject matter provided herein includes methods and systems for collecting, processing, and visualizing operational data of distributed resources via a heatmap by a monitoring system in a distributed environment.

13 Claims, 6 Drawing Sheets

(56) References Cited

U.S. PATENT DOCUMENTS

2015/0288569 A1* 10/2015 Agarwal ............. H04L 41/0886
709/224
2016/0013990 A1* 1/2016 Kulkarni ............... H04L 41/065
709/224

* cited by examiner

FIGURE 3

| | date | time | cpuBusy | | Stats | |
|---|---|---|---|---|---|---|
| 1 | | | | | | |
| 2 | 20150803 | 0:00:00 | 9 | | 99th percentile | 100 |
| 3 | 20150803 | 0:00:05 | 13 | | 95th percentile | 68 |
| 4 | 20150803 | 0:00:10 | 24 | | 90th percentile | 64 |
| 5 | 20150803 | 0:00:15 | 24 | | min | 5 |
| 6 | 20150803 | 0:00:20 | 11 | | max | 100 |
| 7 | 20150803 | 0:00:25 | 10 | | avg | 55.62123 |
| 8 | 20150803 | 0:00:30 | 11 | | | |
| 9 | 20150803 | 0:00:35 | 11 | | | |
| 10 | 20150803 | 0:00:40 | 9 | | | |

FIGURE 4

| Process | 03 | 04 | 05 | 06 | 07 | 08 | 09 | 10 | 11 | 12 | 13 | 14 | 17 | 18 | 19 | 20 | 21 | 24 | 25 | 26 | 27 | 28 | 31 |
|---|---|---|---|---|---|---|---|---|---|---|---|---|---|---|---|---|---|---|---|---|---|---|---|
| Ssh daemon | 100 | 80 | 77 | 78 | 88 | 88 | 60 | 88 | 90 | 94 | 87 | 81 | 57 | 58 | 57 | 60 | 59 | | 61 | 60 | 58 | 58 | 55 |
| Number watcher | 57 | 55 | 100 | 56 | 58 | 70 | 65 | 60 | 56 | 55 | 59 | 59 | 55 | 53 | 52 | 56 | 55 | 65 | 59 | 56 | 65 | 58 | 68 |
| http server | 64 | 64 | 65 | 70 | 70 | 70 | 75 | 64 | 64 | 64 | 64 | 73 | 52 | 45 | 57 | 54 | 53 | 32 | 36 | 54 | 37 | 27 |
| fnet-tp-chix1 | 49 | 50 | 49 | 50 | 48 | 51 | 50 | 50 | 53 | 50 | 52 | 53 | 50 | 51 | 52 | 54 | 66 | 57 | 60 | 54 | 52 | 52 |

Raise new Remedy call

Urgency:
3-Medium

Status:
Draft

Impact:
4-Minor/Localized

Investigation Driver:
Capacity Management

Summary:
CPU breach for fnet-hsap 1

Notes:
Any additional notes

Due date:
2016-12-21

[ Log to Remedy/add new PBI ]  [ Add existing PBI ]  [ Exit ]

FIGURE 7

SYSTEM CAPACITY HEATMAP

CROSS REFERENCE TO RELATED APPLICATIONS

This application claims benefit of U.S. Provisional Patent Application No. 62/266,841, filed Dec. 14, 2015, the entirety of which is herein incorporated by reference.

BACKGROUND

Advances in technology and analytics have prompted a shift towards decentralized, distributed computing environments. The growth of data volume has created a need for economies of scale in computing. Thus, distributed environments and resource sharing have recently become increasingly popular. In a distributed environment, such as the cloud, consumer applications, such as email, document hosting, backup services, and banking and financial services, are deployed over a network to geographically distributed physical resources, such as a plurality of servers. Benefits to consumers include scalability, sustainability, and reliability. However, in addition to ensuring that consumer applications are allocated and reallocated optimally to the distributed resources to meet demands, distributed environment operators must often also consider how the interplay between the network layer and the geographically distributed physical layer can affect performance of particular consumer applications. For example, algorithmic or high-speed trading applications rely not only on computational speed, but also network latency, and consumers in this field often prefer that the servers on which their algorithms execute are geographically close to markets.

Distributed resources are now increasingly equipped with hardware and software that enable the resources to record and report operational information. With such operational information, distributed environment operators can analyze resource conditions and performance across a distributed environment through visualization techniques. In managing a distributed environment, it can be beneficial to collect resource information at certain intervals of time and display a graphical representation of one or more metrics across a given time period. Often, however, such time-series data are represented in the form of a line graph or plot, and are not easily manipulated by the user seeking to extract certain information quickly. Thus, line graphs and plots can often be ineffective in displaying certain metrics associated with the distributed resources.

There remains a need for techniques to collect, analyze, and visualize operational information in a distributed environment, and to allow for the configuring and provisioning of distributed resources based on monitored and measured operational data associated with the distributed resources in the distributed environment.

The disclosed subject matter is directed to methods and systems for collecting, processing, and visualizing operational data of distributed resources by a monitoring system in a distributed environment. The monitoring system herein described can be configured to generate a time-series graphical display of the operational data collected from the distributed resources in a distributed environment in the form of a heatmap.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter is directed to systems and methods for monitoring and visualizing operational data of distributed resources in a distributed environment.

In one embodiment, a method for collecting, processing, and visualizing distributed resource information associated with distributed resources in a distributed environment is provided, such as for example, via a heatmap displayed on a graphical interface. The method includes receiving, by a central server of a monitoring system, data associated with a plurality of variables measured and/or monitored over a period of time at one or more distributed resources over a network. The method further includes storing, by the monitoring system, the collected data for the plurality of variables, calculating, based on the stored data, metric values corresponding to a plurality of time intervals during the period of time over which the data was measured and/or monitored for each distributed resource, and generating, by the monitoring system, a graphical representation of the calculated metric values. The generating can include determining visual indicators to represent the calculated metric values for the given time interval of the associated distributed resource and mapping the visual indicators onto the graphical representation. The visual indicator can be a color, hue, gradient, shade, pattern, or other format. The method can also include displaying the graphical representation on a terminal device.

In another embodiment, a computer system for collecting, processing, and visualizing data of distributed resources in a distributed environment is disclosed. The computer system includes a processor and a memory storing instructions that, when executed by the processor, cause the computer system to receive, by a monitoring component of a monitoring system, data associated with a plurality of variables monitored over a period of time at one or more distributed resources over a network, and store, by the monitoring system, said data associated with the plurality of variables. The memory can further store instructions that, when executed by the processor, further cause the computer system to calculate, based on said stored data, metric values corresponding to a plurality of time intervals during said period of time, generate a graphical representation of the metric values corresponding to said time intervals for each distributed resource, and display the graphical representation on a terminal device. The generating includes determining visual indicators to represent each of the metric values at said time intervals for each distributed resource, and mapping the visual indicators onto the graphical representation. Thus, the time-series data collected from the distributed resources in the distributed environment can be presented in the form of a heatmap.

In another embodiment, a non-transitory computer-readable medium storing instructions that, when executed by a processor, cause a computer system to collect, process, and visualize data of distributed resources in a distributed environment is disclosed. The computer system can perform the steps of receiving, by a monitoring component of a monitoring system, data associated with a plurality of variables monitored over a period of time at one or more distributed resources over a network, storing, by the monitoring system, said data associated with the plurality of variables, and calculating, based on said stored data, metric values corresponding to a plurality of time intervals during said period of time. The computer system can further perform the steps of generating a graphical representation of the metric values corresponding to said time intervals for each distributed resource, and displaying the graphical representation on a terminal device. The generating includes determining visual indicators to represent each of the metric values at said time intervals for each distributed resource and mapping the visual indicators onto the graphical representation.

Among others, the present disclosure reduces and can eliminate the problems and disadvantages associated with monitoring and visualization techniques disclosed in prior art.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the disclosed subject matter. Together with the description, the drawings serve to explain the principles of the disclosed subject matter.

BRIEF DESCRIPTION OF THE DRAWINGS

FIG. 3 illustrates one or more embodiments of the disclosed subject matter.

FIG. 4 illustrates operational values for a given distributed resource over a period of time as well as metric values calculated therefrom, according to one embodiment described herein.

FIG. 5 illustrates another embodiment of the disclosed subject matter.

FIG. 6 illustrates another embodiment of the disclosed subject matter.

FIG. 7 illustrates another embodiment of the disclosed subject matter.

DETAILED DESCRIPTION

Reference will now be made in detail to the various exemplary embodiments of the disclosed subject matter, exemplary embodiments of which are illustrated in the accompanying drawings. The methods and systems described herein can be used for generating a graphical representation, such as a heatmap, for displaying and visualizing a given metric associated with one or more distributed resources in a distributed environment. A heatmap generally refers to a graphical display of data in which values are located in a matrix and indicated by the intensity of a color, hue, shading or some other gradient, or by geometric shape or other format. Heatmaps provide a way of visualizing metrics of a large number of resources easily for capacity management, among other uses. Generally, and as set forth in greater detail, the disclosed subject matter provided herein includes methods and systems for collecting, processing, and visualizing operational data of distributed resources via a heatmap by a monitoring system in a distributed environment.

Resources in a distributed environment can perform tasks simultaneously, consuming power, CPU, and memory, among other measurable variables. For example, distributed resources can include servers configured to perform computations or store information. In one embodiment of the disclosed subject matter, a monitoring system 100 is provided. Monitoring system 100 can comprise one or more monitoring components, such as one or more servers, which periodically measure or collect data associated with such operational variables. With reference to the embodiment of FIG. 1, for purposes of illustration and not limitation, the monitoring component can comprise a central server 110, which collects data from one or more individuals servers 120, 130, 140 on a daily basis. In certain embodiments, the central server 110 may include a server computer, a desktop computer, a laptop computer, a cloud-based computing device, among other available computing devices. In some embodiments, the central server 110 may comprise multiple computers. Furthermore, in certain embodiments, the one or more individual servers 120, 130, 140 may include a server computer, a desktop computer, a laptop computer, a cloud-based computing device, among other available computing devices. In this non-limiting embodiment, the individual servers 120, 130, 140 can collect data from the one or more distributed resources 121-123, 131-133, and 141-143, respectively, every 5 seconds. In addition to static data, such as but not limited to resource identification information including resource or host name, processor architecture (i.e., number of cores), and/or location of resource, the data collected from the resources can include, among other measurable information, memory usage and/or availability (GB), CPU speed (MHz), and start and end hour such as the time when the resource is available or running.

Figure 1:
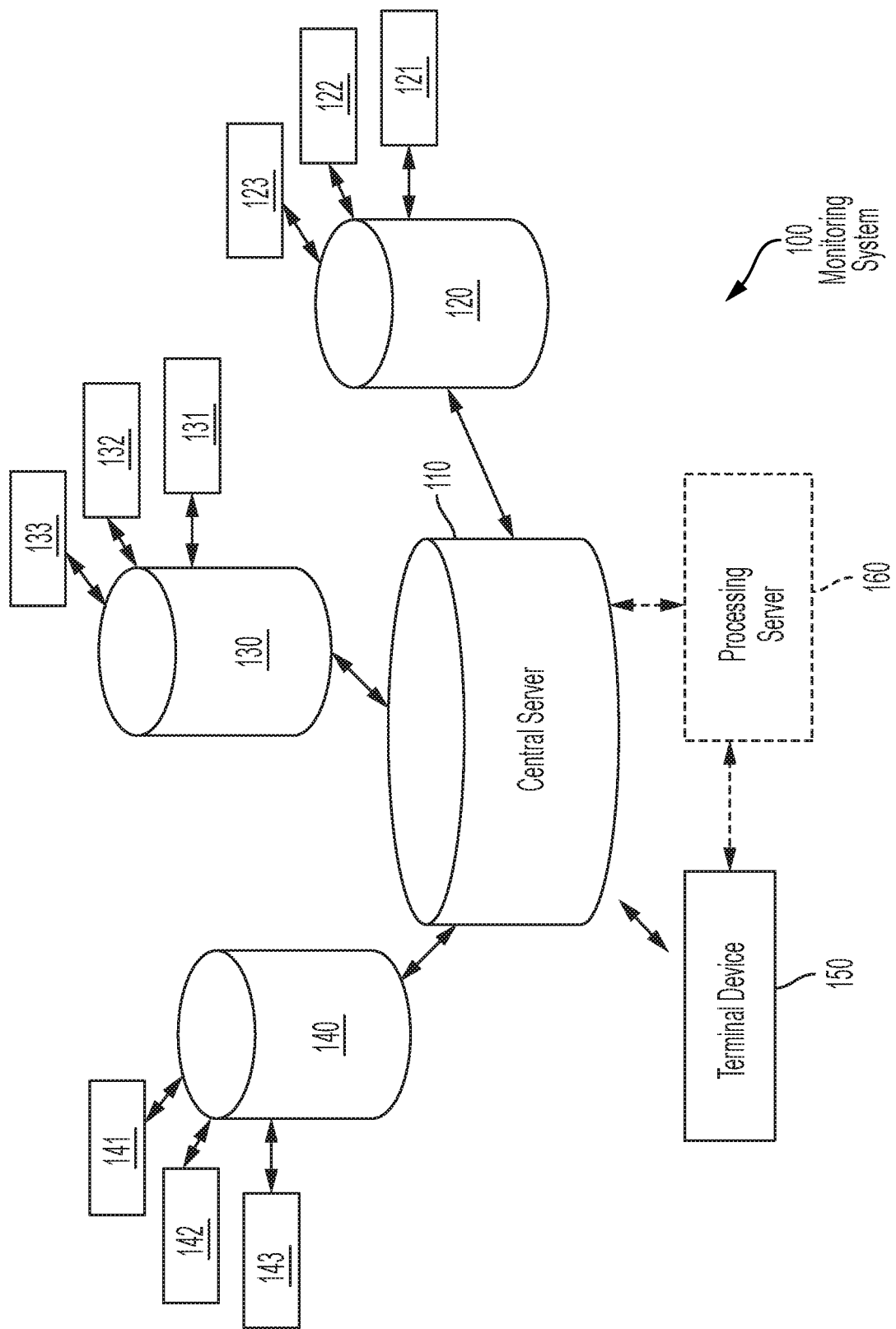
FIG. 1 illustrates a schematic block diagram of an aspect of one or more embodiments described herein.
Figure 2:
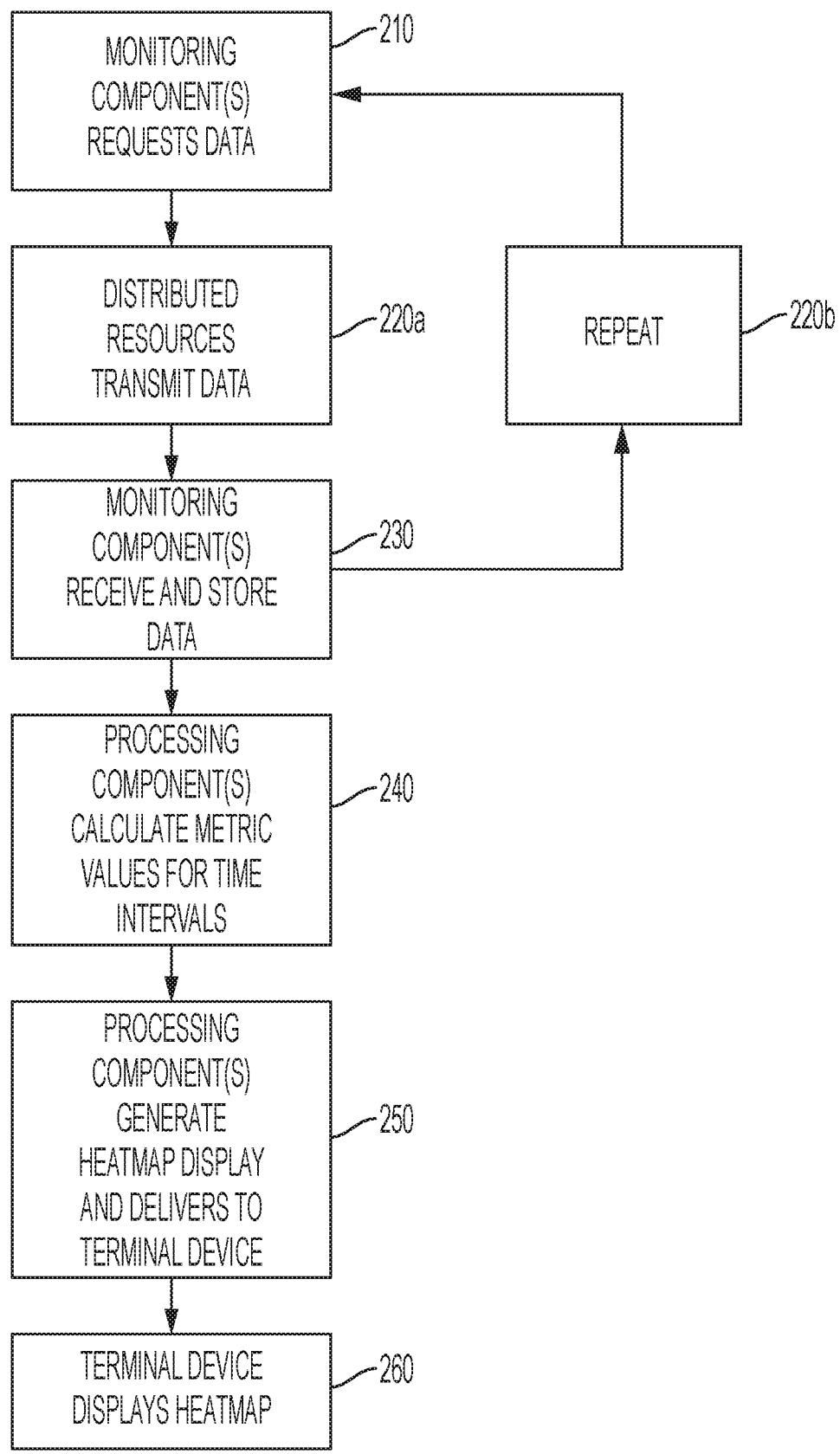
FIG. 2 illustrates a flowchart of another aspect of one or more embodiments described herein.

Monitoring system 100 can then use the collected data to calculate one or more given metrics associated with the distributed resources. The monitoring system 100 can calculate metric values corresponding to a plurality of time intervals based on the collected data for each distributed resource. The metrics can include, for the purpose of example and not limitation, CPU usage of a given resource, CPU usage of an individual process on a given resource, memory usage and/or availability, network usage, network congestion and/or latency, and disk latency. In the embodiment of FIG. 1, for purposes of illustration and not limitation, the metric values are calculated by a processing component, such as processing server 160 of the monitoring system 100, configured with logic to calculate one or more of a given metric. In certain embodiments, the processing server 160 may include a server computer, a desktop computer, a laptop computer, a cloud-based computing device, among other available computing devices. The processing component can comprise one or more processors contained within the one or more monitoring components, or alternatively, and as depicted in dashed lines in the embodiment of FIG. 1, can be a standalone component configured, for example, to receive and transmit information from and to the monitoring components, such as central server 110.

Figure 3:
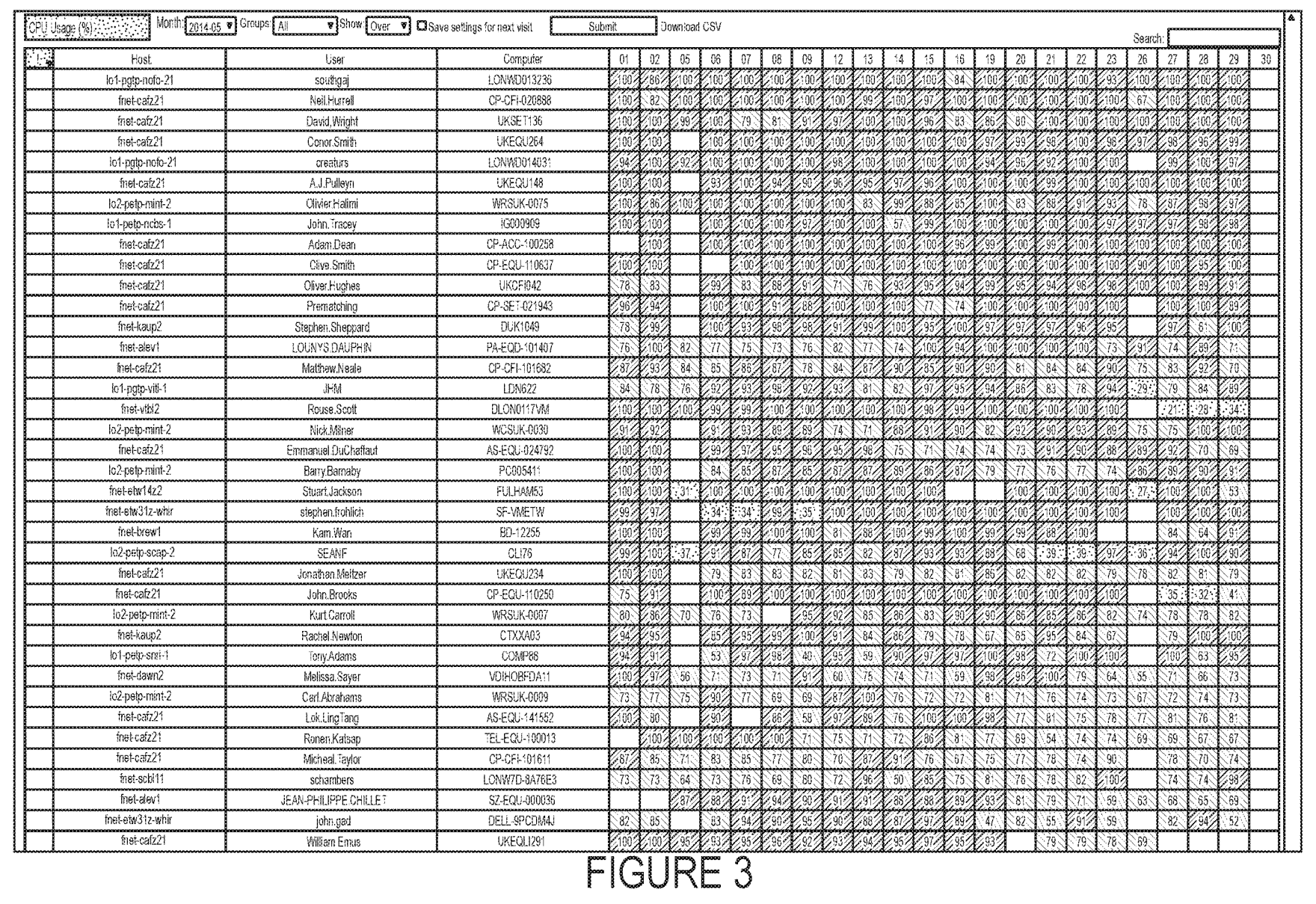

Based on the calculated metric values, the monitoring system 100 can assign a visual indicator to represent the metric value corresponding to each of the time intervals for each distributed resource. The visual indicator can be, for example and not limitation, a particular color, hue, or shading, to be mapped to and displayed on a heatmap or other graphical representation. In some embodiments, processing server 160 can determine the visual indicators based on stored distributed resource data and stored metric thresholds corresponding to categories of resource data for each corresponding time interval. In certain non-limiting embodiments, distributed environment metrics can be displayed on a heatmap having a fixed vertical height along a time dimension, as depicted in the embodiment of FIG. 3. Accordingly, the monitoring system 100 can map the visual indicator to a cell on the heatmap corresponding to the time interval for which the metric value was calculated. According to this embodiment, the visual indicator can indicate a specific state of the distributed resource during the time interval, as well as indicate trends over the data collection period, e.g., over the course of a day. By way of example and not limitation, if the calculated metric is CPU usage, the color green can indicate a light CPU workload corresponding to the distributed resource at a given time interval on the heatmap, whereas the color red can indicate a heavy workload.

In another embodiment, the time-series metric values for the time intervals can overlay the visual indicators on the heatmap, as depicted in the embodiment of FIG. 3. The heatmap, or other graphical representation, of the herein disclosed subject matter can be displayed on a graphical user interface at a terminal device 150, wherein terminal device 150 can include a PC, workstation, and/or a mobile device. Accordingly, in some embodiments, the heatmap can be configured to allow users to manipulate the display such as through the use of drop-down menus, radio buttons, or other graphical control elements to selectively display a desired metric on the heatmap. In yet another non-limiting embodiment, users can selectively display certain resources, such as, for example, resources corresponding to low latency metric values, or those having values falling below a certain threshold, or resources represented on the heatmap by a certain color or visual indicator. In still another non-limiting embodiment, the heatmap representation can be manipulated to display the time-series metric values and/or visual indicators in order from high to low or low to high. Additionally, or alternatively, the heatmap representation can be manipulated to display the time-series metric values and/or visual indicators by geographic location. Certain other non-limiting embodiments provide for manipulating the heatmap representation to display resources ordered in groups according to location, or displaying resources ordered from those resources geographically closest to the user to those farthest from the user, or farthest from the user to those closest to the user.

In another embodiment, the heatmap representation can be configured to display information obtained from the monitoring system concerning data breaches associated with one or more of the distributed resources. As herein embodied, a breach can be represented by the "!" or other character or indicator.

By way of example and not limitation, in one embodiment, the data collected from the distributed resources 121-123, 131-133, 141-143, by one or more individual servers 120, 130, 140, can be collected and stored in files on the individual servers 120, 130, 140. The files can be any of a plurality of file types such as flat files, database files, markup language files, or the like. The central server 110 of the embodiment herein described can receive two or more batch file transfers of the collected data from the individual servers 120, 130, 140, respectively. Accordingly, the individual servers 120, 130, 140 can be specifically configured with memory components and file transfer technology to manage and transmit the data to the central server over a network (not shown). Thus, in certain non-limiting embodiments, if a batch file transfer fails, a warning can be raised on the monitoring system 100 and the file transfer can be re-run. Missing data can be represented, for example and not limitation, as an empty cell or a value of −2 on the heatmap of the disclosed subject matter. The heatmap, or other graphical representation, can be generated, as previously disclosed, based on the data and transmitted to terminal device 150 by, for example and not limitation, a HTML email over a network.

Referring to FIG. 3, for the purpose of illustration and not limitation, various embodiments of the graphical representation generated by the herein described monitoring system can comprise a heatmap display of a given metric corresponding to the distributed resources in a distributed environment at various time intervals along a time axis. By way of example and not limitation, the heatmap representation of FIG. 3 displays metric values as well as color indicators corresponding to CPU usage in each cell for one-day timeslots of every working day in a month. The metric values of the heatmap cells in FIG. 3 represent the 99th percentile of CPU usage for each work day during the month of May in the year 2014. To display the heatmap representation of FIG. 3, the monitoring server of the embodiment of FIG. 3 collects operational data for CPU usage from each resource approximately every 5 minutes in a 24-hour period and calculates the 99th percentile, 95th percentile, 90th percentile, minimum, maximum, and average CPU usage across the 24-hour period, as listed in FIG. 4. For example, and with reference again to FIG. 3, on May 5, 2014, resource LONWD013236 had a 99th percentile CPU usage value of 100, indicated by a red cell, where the color red can represent a high metric value, such as high CPU usage in this example. In contrast, on May 5, 2014, resource FULHAM53 had a 99th percentile CPU usage of 31, indicated by a blue cell in FIG. 3, where the color blue can represent a low metric value, such as low CPU usage.

Figure 6:
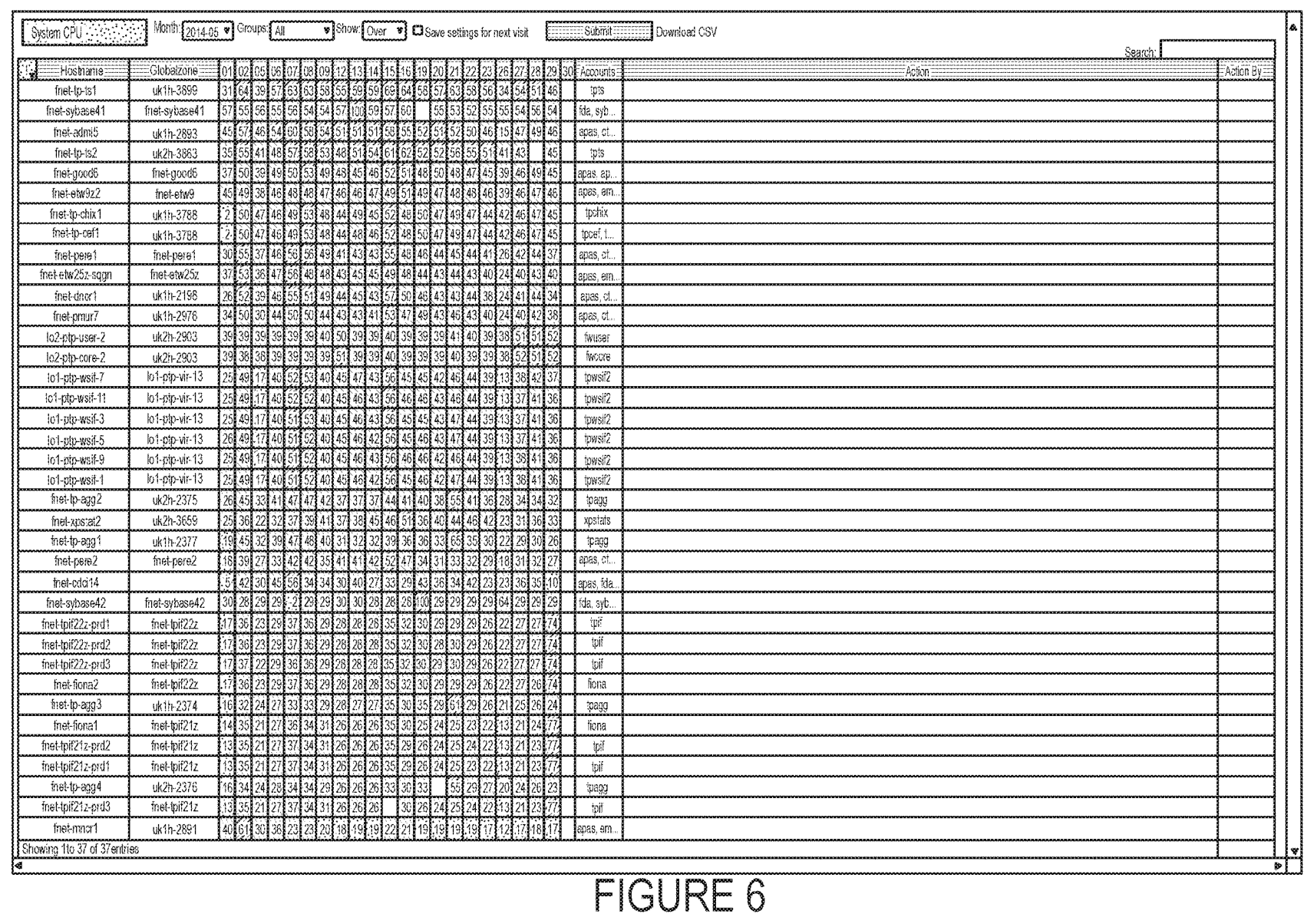

With continued reference to FIG. 3, the vertical columns of the heatmap representation additionally display distributed resource identification information such as the name of the network host associated with the distributed resource, the named user of the resource, and the name of the resource of interest. In the embodiment of FIG. 3, the heatmap representation can be configured to display resource metric values and indicators in order of intensity by selecting graphical control elements on a navigation and/or formatting toolbar of the display. Other embodiments of the present disclosure can include additional or different ways to manipulate the display and ordering of the metric values and visual indicators In another embodiment of the present disclosure, the heatmap representation can be configured to display time-series metric values and visual indicators associated with all processes running on a given distributed resource, as shown by way of example in FIG. 5 and FIG. 6.

Further functionality of the disclosed subject matter can include, but is not limited to, grouping and display of types of distributed resources. For example, types of distributed resources can include resources used as market data servers, or co-location resources available for running order or execution management systems. In this embodiment, the graphical interface displaying the heatmap or other representation can comprise a drop-down menu from a navigation and/or formatting toolbar of the heatmap display for selecting the display of types of groups.

In another embodiment of the present disclosure, as shown in FIG. 7, the monitoring system 100 and/or the heatmap representation can be implemented as being integrated with a problem management system for tracking and reporting issues associated with, for example, data breaches of one or more distributed resources. By way of example only, text describing a problem or action may be entered into and/or received by an Action column (shown in FIG. 6). The text may be hyperlinked, such that the text is transmitted to the problem management software for tracking. In another example, an action may be entered into an action area of a selected Action column (shown in FIG. 6). The selection of the action area may cause an information request window (shown in FIG. 7) to be displayed. In some embodiments, the information request window may be an Existing Call Status window. Information relating to a problem of the one or more distributed resources may be entered and/or logged into the information request window. The information relating to the problem may include an urgency rating, a status, an impact, an investigation driver, a summary, notes and/or a due date, as shown in FIG. 7. Entering and/or logging the information relating to the problem subsequently opens a record in the problem management system for tracking the problem and/or reporting issues associated with the problem (e.g., data breaches of one or more distributed resources). As such, the problem management system allows for the recording, monitoring, and/or tracking of known problems. In some embodiments, the problem management system may be a separate and/or distinct system and/or program, but allows for the transfer of information between multiple systems and/or programs.

Although one or more embodiments have been described herein in some detail for clarity of understanding, it should be recognized that certain changes and modifications can be made without departing from the spirit of the disclosure. The embodiments described herein can employ various computer-implemented operations involving data stored in computer systems. Furthermore, the embodiments described herein employ various computer-implemented operations which can be adapted to be part of a computer system, the cloud, etc. For example, these operations can require physical manipulation of physical quantities—usually, though not necessarily, these quantities can take the form of electrical or magnetic signals, where they or representations of them are capable of being stored, transferred, combined, compared, or otherwise manipulated. Further, such manipulations are often referred to in terms, such as producing, yielding, identifying, determining, comparing, receiving, storing, calculating, or generating. Any operations described herein that form part of one or more embodiments of the disclosure can be useful machine operations. In addition, one or more embodiments of the disclosure also relate to a device or an apparatus for performing these operations. The apparatus can be specially constructed for specific required purposes, or it can be a general purpose computer selectively activated or configured by a computer program stored in the computer. In particular, various general purpose machines can be used with computer programs written in accordance with the teachings herein, or it can be more convenient to construct a more specialized apparatus to perform the required operations.

The embodiments described herein can be practiced with other computer system configurations including hand-held devices, microprocessor systems, microprocessor-based or programmable consumer electronics, minicomputers, mainframe computers, and the like.

One or more embodiments of the present disclosure can be implemented as one or more computer programs or as one or more computer program modules embodied in one or more computer readable media. The term computer readable medium refers to any data storage device that can store data which can thereafter be input to a computer system—computer readable media can be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Disc), a CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications can be made within the scope of the claims. Accordingly, the described embodiments are to be considered as illustrative and not restrictive, and the scope of the claims is not to be limited to details given herein, but can be modified within the scope and equivalents of the claims. In the claims, elements do not imply any particular order of operation, unless explicitly stated in the claims.

Many variations, modifications, additions, and improvements can be made. Plural instances can be provided for components, operations or structures described herein as a single instance. Boundaries between various components, operations and data stores are somewhat arbitrary, and particular operations are illustrated in the context of specific illustrative configurations. Other allocations of functionality are envisioned and can fall within the scope of the disclosure(s). In general, structures and functionality presented as separate components in exemplary configurations can be implemented as a combined structure or component. Similarly, structures and functionality presented as a single component can be implemented as separate components. It will be apparent to those skilled in the art that various modifications and variations can be made in the method and system of the disclosed subject matter without departing from the spirit or scope of the disclosed subject matter. These and other variations, modifications, additions, and improvements can fall within the scope of the appended claim(s) and their equivalents.

What is claimed is:

1. A method for collecting, processing, and visualizing data of distributed resources in a distributed environment by a monitoring system, the monitoring system comprising at least a collecting server, a processing server, and a terminal device configured to communicate over a network, and wherein the collecting server is configured to communicate with one or more distributed resources over the network, comprising:

receiving, by the collecting server, data associated with a plurality of variables monitored over a period of time at the one or more distributed resources over the network, wherein the data associated with the plurality of variables is included in one or more batch files;

determining, by the one or more distributed resources, whether an error occurred during transmission of the one or more batch files;

generating, in the monitoring system, an error warning associated with the error;

retransmitting, by the one or more distributed resources, the one or more batch files based on the error; and receiving, by the collecting server, the one or more retransmitted batch files;

storing, by the collecting server, the data associated with the plurality of variables;

calculating, by the processing server, metric values based on the stored data, wherein the metric values correspond to a plurality of time intervals during the period of time;

generating, by the processing server, a graphical representation of the metric values corresponding to the time intervals for each distributed resource, wherein the generating comprises:

determining, based on the metric values, visual indicators to represent each of the metric values at the time intervals for each distributed resource, wherein each of the visual indicators corresponds with one of a plurality of threshold values, and mapping the visual indicators to a set of cells along a time axis within a window of the graphical representation;

displaying the graphical representation on a terminal device, wherein the graphical representation is a heatmap and wherein the graphical representation includes interactive elements to selectively display a desired metric;

rendering and displaying, on the graphical representation, the metric values corresponding to each of the visual indicators on the terminal device, wherein the metric values are displayed on a portion of the graphical representation corresponding to each metric value respectively; and recording, by the process server, one or more data breaches of the one or more distributed resources and information corresponding to the one or more data breaches to an information request window of a problem management system, wherein the corresponding information includes at least one of an urgency rating, a status, an impact, an investigation driver, a summary, a note, and a due date, and wherein the problem management system is illustrated within the graphical representation;

monitoring, by the process server, data breaches of the one or more distributed resources recorded in the problem management system;

transferring the recorded data breach or information corresponding to the one or more data breaches between at least the problem management system and a second system or a second program, wherein the second system or the second program is distinct from the problem management system; and rendering a breach indicator on the graphical representation corresponding to the one or more data breaches, wherein the breach indicator includes an interactive component which enables performance of a plurality of data breach management functions.

2. The method of claim 1, wherein the metric values include at least one of CPU usage of a first resource of the one or more distributed resources, CPU usage of an individual process on a second resource of the one or more distributed resources, memory usage, memory availability, network usage, network congestion, network latency, or disk latency.

3. The method of claim 1, wherein the visual indicators representing each of the metric values at said time intervals for each distributed resource include a color, hue, shade, pattern, or marking.

4. The method of claim 1, wherein the metric values correspond with pre-determined percentiles of usage of each of the one or more distributed resources.

5. A computer system for collecting, processing, and visualizing data of distributed resources in a distributed environment, comprising:

a monitoring system having at least a collecting server, a processing server, and a terminal device configured to communicate over a network, and wherein the collecting server is configured to communicate with one or more distributed resources over the network;

the monitoring system further having a processor and a memory storing instructions that, when executed by the processor, cause the computer system to:

receive, by the collecting server, data associated with a plurality of variables monitored over a period of time at the one or more distributed resources over the network, wherein the data associated with the plurality of variables is included in one or more batch files;

determine, by the one or more distributed resources, whether an error occurred during transmission of the one or more batch files;

generate, in the monitoring system, an error warning associated with the error;

retransmit, by the one or more distributed resources, the one or more batch files based on the errors; and receive, by the collecting server, the one or more retransmitted batch files;

store, by the collecting server, the data associated with the plurality of variables;

calculate, by the processing server, metric values based on the stored data, wherein the metric values correspond to a plurality of time intervals during the period of time;

generate, by the processing server, a graphical representation of the metric values corresponding to the time intervals for each distributed resource, wherein the generating comprises:

determining, based on the metric values, visual indicators to represent each of the metric values at the time intervals for each distributed resource, wherein each of the visual indicators corresponds with one of a plurality of threshold values, and mapping the visual indicators to a set of cells along a time axis within a window of the graphical representation;

displaying the graphical representation on a terminal device, wherein the graphical representation is a heatmap and wherein the graphical representation includes interactive elements to selectively display a desired metric;

rendering and displaying, on the graphical representation, the metric values corresponding to each of the visual indicators on the terminal device, wherein the metric values are displayed on a portion of the graphical representation corresponding to each metric value respectively; and record, by the process server, one or more data breaches of the one or more distributed resources and information corresponding to the one or more data breaches to an information request window of a problem management system, wherein the corresponding information includes at least one of an urgency rating, a status, an impact, an investigation driver, a summary, a note, and a due date, and wherein the problem management system is illustrated within the graphical representation;

monitor, by the process server, data breaches of the one at more distributed resources recorded in the problem management system;

transfer the recorded data breach or information corresponding to the one or more data breaches between at least the problem management system and a second system or a second program, wherein the second system or the second program is distinct from the problem management system; and render a breach indicator on the graphical representation corresponding to the one or more data breaches, wherein the breach indicator includes an interactive component which enables performance of one of a plurality of data breach management functions.

6. The computer system of claim 5, wherein the metric values include at least one of CPU usage of a first resource of the one or more distributed resources, CPU usage of an individual process on a second resource of the one or more distributed resources, memory usage, memory availability, network usage, network congestion, network latency, or disk latency.

7. The computer system of claim 5, wherein the visual indicators representing each of the metric values at said time intervals for each distributed resource include a color, hue, shade, pattern, or marking.

8. The computer system of claim 5, wherein the metric values correspond with pre-determined percentiles of usage of each of the one or more distributed resources.

9. The computer system of claim 5, wherein the monitoring component of the monitoring system includes a central server operatively connected to one or more individual servers.

10. A non-transitory computer-readable medium storing instructions that, when executed by a processor, cause a computer system to collect, process, and visualize data of distributed resources in a distributed environment by a monitoring system, the monitoring system comprising at least a collecting server, a processing server, and a terminal device configured to communicate over a network, and wherein the collecting server is configured to communicate with one or more distributed resources over the network, by performing the steps of:

receiving, by the collecting server, data associated with a plurality of variables monitored over a period of time at the one or more distributed resources over the network, wherein the data associated with the plurality of variables is included in one or more batch files;

determining, by the one or more distributed resources, whether an error occurred during transmission of the one or more batch files;

generating, in the monitoring system, an error warning associated with the error;

retransmitting, by the one or more distributed resources, the one or more batch files based on the error; and receiving, by the collecting server, the one or more retransmitting batch files;

storing, by the collecting server, the data associated with the plurality of variables;

calculating, by the processing server, metric values based on the stored data, wherein the metric values correspond to a plurality of time intervals during the period of time;

generating, by the processing server, a graphical representation of the metric values corresponding to the time intervals for each distributed resource, wherein the generating comprises;

determining, based on the metric values, visual indicators to represent each of the metric values at the time intervals for each distributed resource, wherein each of the visual indicators corresponds with one of a plurality of threshold values, and mapping the visual indicators to a set of cells along a time axis within a window of the graphical representation;

displaying the graphical representation on a terminal device, wherein the graphical representation is a heatmap and wherein the graphical representation includes interactive elements to selectively display a desired metric;

rendering and displaying, on the graphical representation, the metric values corresponding to each of the visual indicators on the terminal device, wherein the metric values are displayed on a portion of the graphical representation corresponding to each metric value respectively; and recording, by the process server, one or more data breaches of the one or more distributed resources and information corresponding to the one or more data breaches to an information request window of a problem management system, wherein the corresponding information includes at least one of an urgency rating, a status, an impact, an investigation driver, a summary, a note, and a due date, and wherein the problem management system is illustrated within the graphical representation;

monitoring, by the process server, data breaches of the one or more distributed resources recorded in the problem management system;

transferring the recorded data breach or information corresponding to the one or more data breaches between at least the problem management system and a second system or a second program, wherein the second system or the second program is distinct from the problem management system; and rendering a breach indicator on the graphical representation corresponding to the one or more data breaches, wherein the breach indicator includes an interactive component which enables performance of a plurality of data breach management functions.

11. The non-transitory computer-readable medium of claim 10, wherein the metric values include at least one of CPU usage of a first resource of the one or more distributed resources, CPU usage of an individual process on a second resource of the one or more distributed resources, memory usage, memory availability, network usage, network congestion, network latency, or disk latency.

12. The non-transitory computer-readable medium of claim 10, wherein the visual indicators representing each of the metric values at said time intervals for each distributed resource include a color, hue, shade, pattern, or marking.

13. The non-transitory computer-readable medium of claim 10, wherein the metric values correspond with pre-determined percentiles of usage of each of the one or more distributed resources.

* * * * *